(12) United States Patent
Wang et al.

(10) Patent No.: US 11,632,997 B2
(45) Date of Patent: Apr. 25, 2023

(54) HEADSET ELECTRONIC DEVICE AND HEADBAND ADJUSTMENT STRUCTURE THEREOF

(71) Applicant: Quanta Computer Inc., Taoyuan (TW)

(72) Inventors: Chun-Wen Wang, Taoyuan (TW); Chun-Nan Huang, Taoyuan (TW); Chun-Lung Chen, Taoyuan (TW); Heng-Min Hu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 415 days.

(21) Appl. No.: 16/929,216

(22) Filed: Jul. 15, 2020

(65) Prior Publication Data
US 2021/0315301 A1 Oct. 14, 2021

(30) Foreign Application Priority Data
Apr. 8, 2020 (TW) ................................. 109204059

(51) Int. Cl.
*A42B 1/22* (2006.01)
*A41D 20/00* (2006.01)
*G06F 1/16* (2006.01)

(52) U.S. Cl.
CPC ................ *A42B 1/22* (2013.01); *A41D 20/00* (2013.01); *G06F 1/163* (2013.01)

(58) Field of Classification Search
CPC ............ G06F 1/163; A41D 20/00; A42B 1/22
See application file for complete search history.

(56) References Cited

U.S. PATENT DOCUMENTS

| D383,455 S | * | 9/1997 | MacInnes | D14/372 |
|---|---|---|---|---|
| 10,684,646 B2 | * | 6/2020 | Wang | G06F 1/163 |
| 11,119,329 B2 | * | 9/2021 | Lin | G02B 27/0176 |
| 11,419,391 B2 | * | 8/2022 | Dong | F16H 19/04 |
| 2015/0316773 A1 | * | 11/2015 | Tazbaz | G02B 27/0179 359/630 |
| 2018/0299681 A1 | * | 10/2018 | Eastwood | G02C 11/10 |
| 2020/0310488 A1 | * | 10/2020 | Lin | G02B 27/0176 |
| 2021/0149205 A1 | * | 5/2021 | Jen | G02B 7/002 |

* cited by examiner

*Primary Examiner* — Derek J Battisti (57) ABSTRACT

A headband adjustment structure includes a base, a wearing unit, a rotary adjusting assembly, a linkage member and an elastic element. The wearing unit includes a first end portion and a second end portion that overlap with each other. The first end portion and the second end portion are movably located in the base to define an adjustable accommodation space. The rotary adjusting assembly is pivotally located within the base, and provided with a gear body meshed with a first toothed rack of the first end portion and a second toothed rack of the second end portion so as to simultaneously move the first end portion and the second end portion in opposite directions for adjusting the adjustable accommodation space. The linkage member is connected to the rotary adjusting assembly. The elastic element abutting against the linkage member and the base, respectively.

9 Claims, 9 Drawing Sheets

HEADSET ELECTRONIC DEVICE AND HEADBAND ADJUSTMENT STRUCTURE THEREOF

RELATED APPLICATIONS

This application claims priority to Taiwan Application Serial Number 109204059, filed Apr. 8, 2020, which is herein incorporated by reference.

BACKGROUND

Field of Disclosure

The disclosure relates to a headset electronic device. More particularly, the disclosure relates to a headset electronic device having a headband adjustment structure.

Description of Related Art

After a present headset electronic device is worn on a user's head, the user is allowed to watch a virtual world of three-dimensional space reproduced by computer simulation through the headset electronic device. Specifically, the present headset electronic device is allowed to adjust an adjustable accommodation space surrounded by the headband thereof by the adjustment of the rotary knob for receiving the user's head.

However, only using the rotary knob cannot properly adjust the adjustable accommodation space of the headband for receiving the user's head so that the headband cannot closely match the specific size of the user's head, thereby not only causing inconvenience to the user, but also reducing the user's willingness to use.

SUMMARY

In one embodiment of the disclosure, a headset electronic device and a headband adjustment structure thereof are provided for solving the problems mentioned in the prior art.

In one embodiment of the disclosure, the headband adjustment structure includes a base, a wearing unit, a rotary adjusting assembly, a linkage member and an elastic element. The wearing unit includes a first end portion and a second end portion which are opposite to and overlapped with each other. The first end portion and the second end portion which are movably located in the base to define an adjustable accommodation space. The first end portion is formed with a first toothed rack, and the second end portion is formed with a second toothed rack. The rotary adjusting assembly is pivotally located within the base, and provided with a gear body. The gear body is arranged between the first toothed rack and the second toothed rack, and meshed with the first toothed rack and the second toothed rack so as to simultaneously move the first end portion and the second end portion in opposite directions for adjusting a size of the adjustable accommodation space. The linkage member is disposed on the base, and connected to the rotary adjusting assembly. The elastic element abuts against the linkage member and the base, respectively. When the first toothed rack and the second toothed rack are simultaneously moved to rotate the gear body, the rotary adjusting assembly is allowed to drive the linkage member to compress the elastic element, so that the elastic element that is compressed stores a restored elastic force.

In one embodiment of the disclosure, a headset electronic device includes a display and a headband adjustment structure. The headband adjustment structure includes a base, a wearing unit, a rotary adjusting assembly, a linkage member and an elastic element. The wearing unit includes a strip body, a first toothed rack and a second toothed rack. The strip body includes a connection portion connected to the display, a first end portion and a second end portion which are opposite to and overlapped with each other. The first end portion and the second end portion are movably located in the base to define an adjustable accommodation space. The first toothed rack is located on the first end portion, and the second toothed rack is located on the second end portion. The rotary adjusting assembly is pivotally located within the base, and provided with a gear body. The gear body is arranged between the first toothed rack and the second toothed rack and meshed with the first toothed rack and the second toothed rack so as to simultaneously move the first end portion and the second end portion in opposite directions for adjusting a size of the adjustable accommodation space. The linkage member is disposed on the base, and connected to the rotary adjusting assembly. The elastic element abuts against the linkage member and the base, respectively. When the first toothed rack and the second toothed rack are simultaneously moved to rotate the gear body, the rotary adjusting assembly is allowed to drive the linkage member to compress the elastic element, so that the elastic element that is compressed stores a restored elastic force.

With the structure described in the above embodiments, the headband adjustment structure not only can appropriately adjust the adjustable accommodation space defined by the headband for the user's head, but also can closely match the specific size of the user's head, thereby increasing the user's willingness to use.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 1:
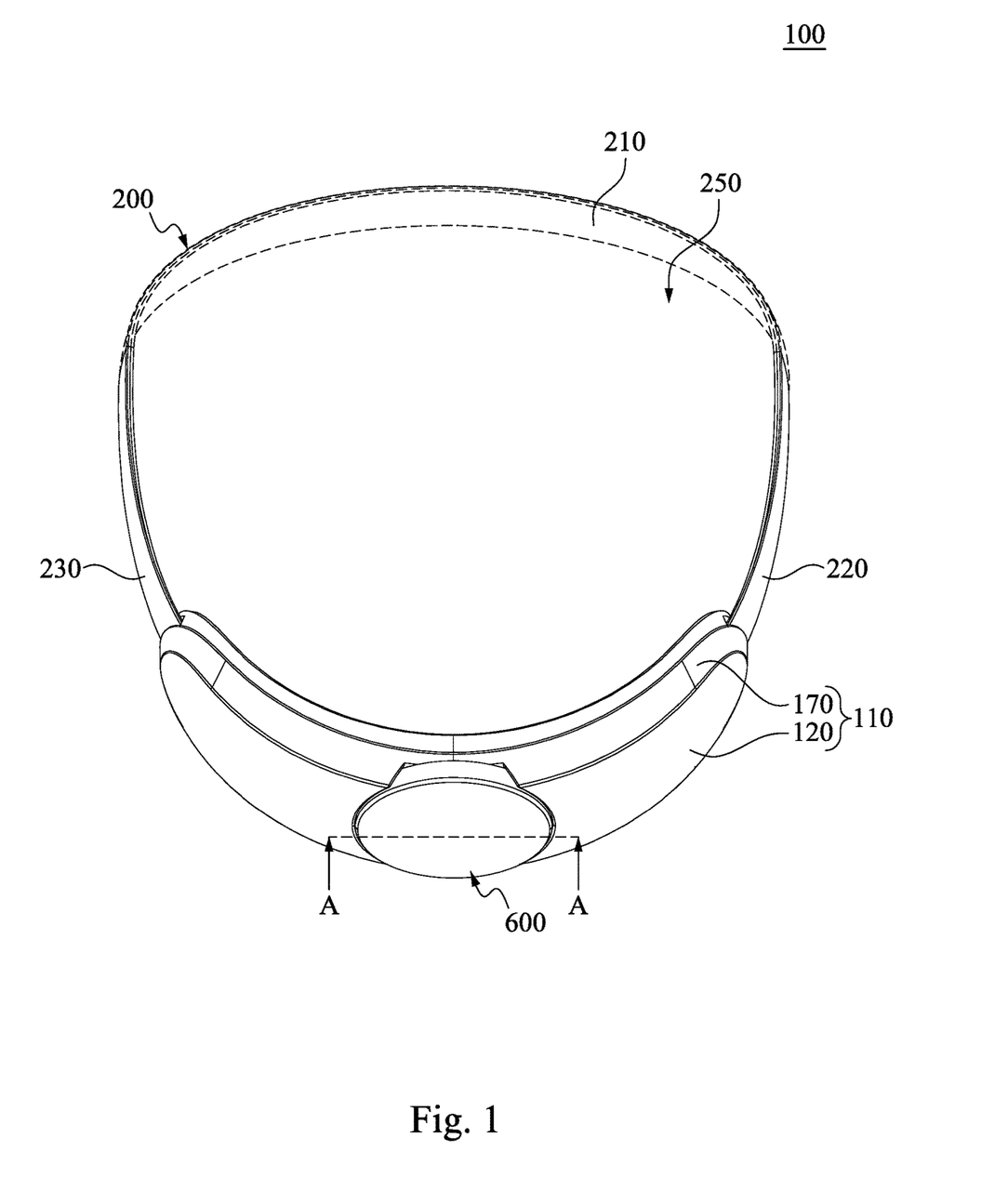
FIG. 1 is a perspective view of a headband adjustment structure according to one embodiment of the disclosure.
Figure 2A:
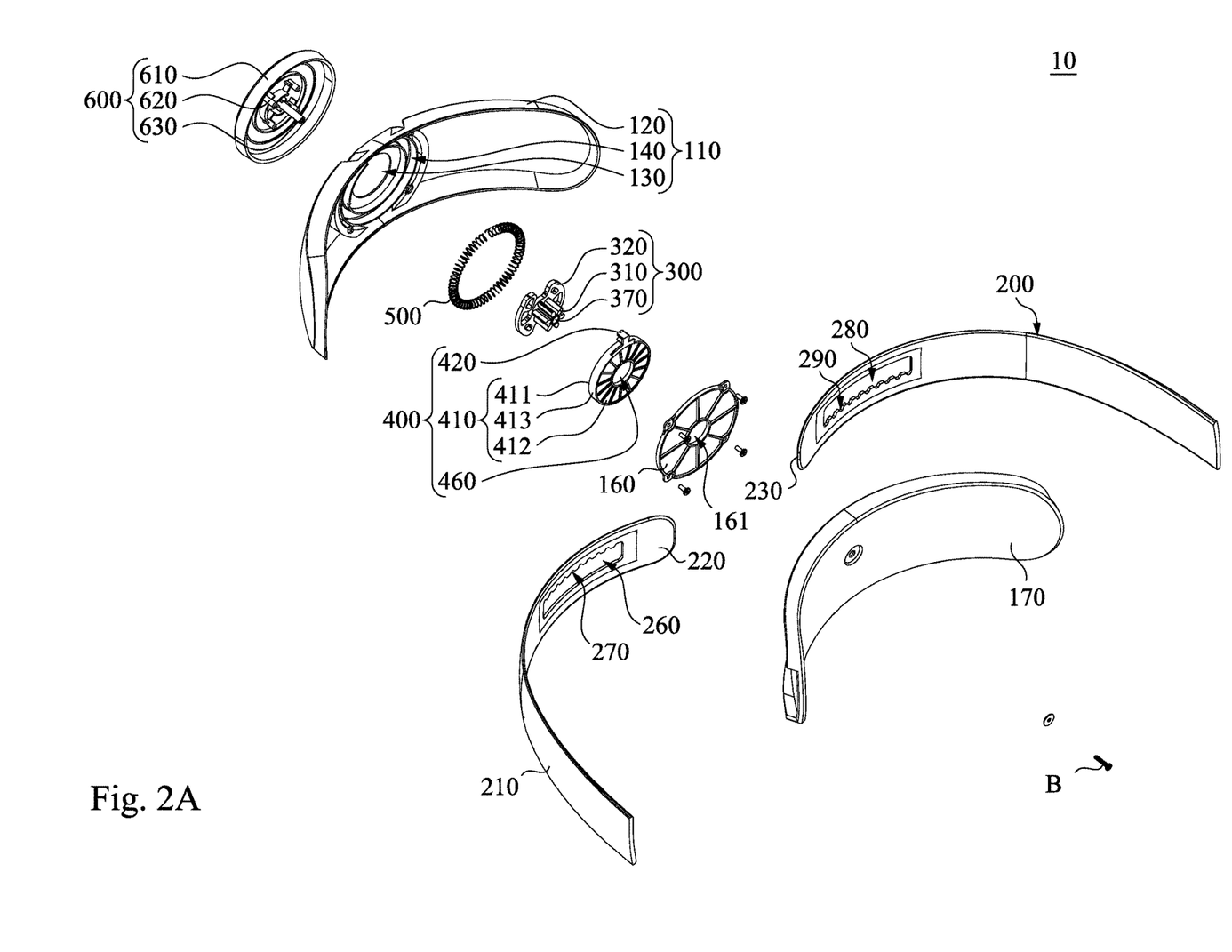
FIG. 2A is an exploded view of the headband adjustment structure of FIG. 1, which is spread out along a direction.
Figure 2B:
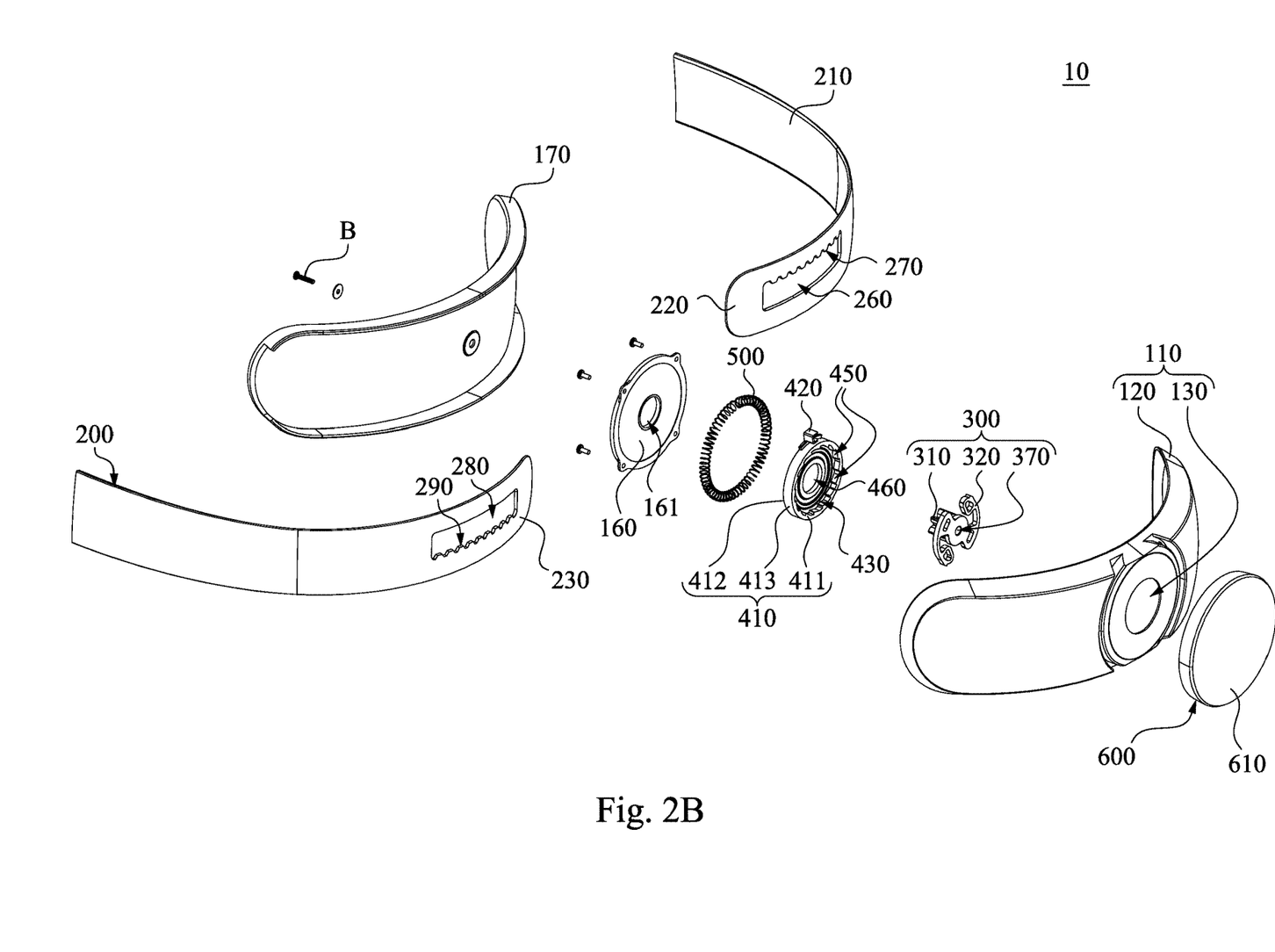
FIG. 2B is an exploded view of the headband adjustment structure of FIG. 1, which is spread out along a reverse direction.
Figure 3:
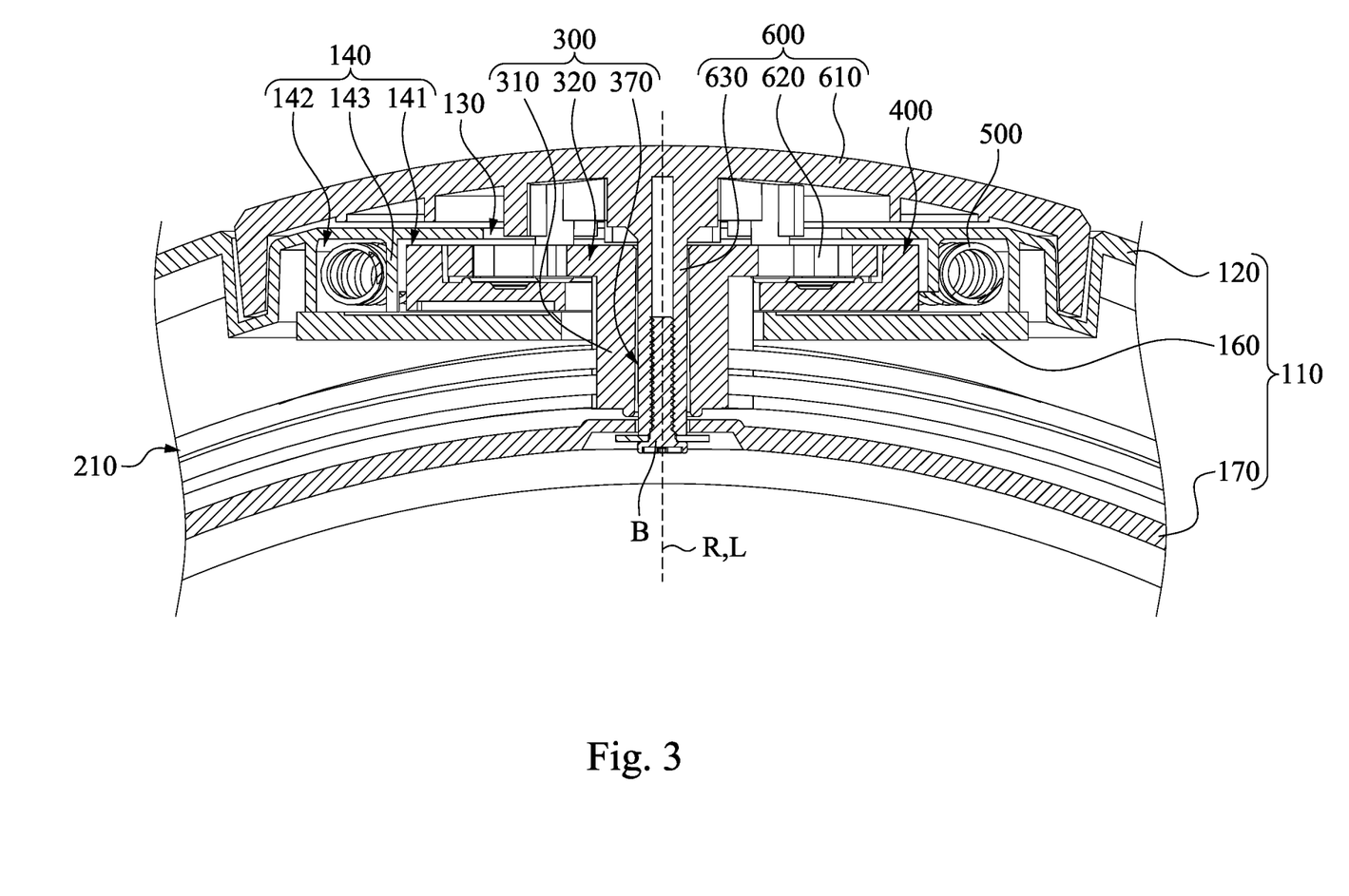
FIG. 3 is a cross-sectional view of the headband adjustment structure of FIG. 1 taken along a line AA.

Reference is now made to FIG. 1 to FIG. 3, in which FIG. 1 is a perspective view of a headband adjustment structure 100 according to one embodiment of the disclosure, FIG. 2A is an exploded view of the headband adjustment structure 100 of FIG. 1, which is spread out along a direction, FIG. 2B is an exploded view of the headband adjustment structure 100 of FIG. 1, which is spread out along an opposite direction, and FIG. 3 is a cross-sectional view of the headband adjustment structure 100 of FIG. 1 taken along a line AA. As shown in FIG. 1 to FIG. 3, the headband adjustment structure 100 includes a base 110, a wearing unit 200, a rotary adjusting assembly 300, a linkage member 400 and an elastic element 500. The base 110, for example is a plastic or a metal case etc. The wearing unit 200 is provided with an adjustable accommodation space 250 (FIG. 1), which means the size of the adjustable accommodation space 250 is adjustable so as to be matchingly worn on a user's head. More specifically, the wearing unit 200 includes a strip body 210. The strip body 210 is bendy, and provided with a first end portion 220 and a second end portion 230 which are opposite to each other. The first end portion 220 and the second end portion 230 are overlapped with each other so as to surround to define the aforementioned adjustable accommodation space 250 inside the strip body 210. The first end portion 220 and the second end portion 230 of the strip body 210 are movably located in the base 110 so that the strip body 210 can be simultaneously pulled to adjust the size of the adjustable accommodation space 250. Thus, the first end portion 220 and the second end portion 230 of the strip body 210 which are drawn in the reverse direction may increase or decrease the size of the adjustable accommodation space 250.

Figure 4:
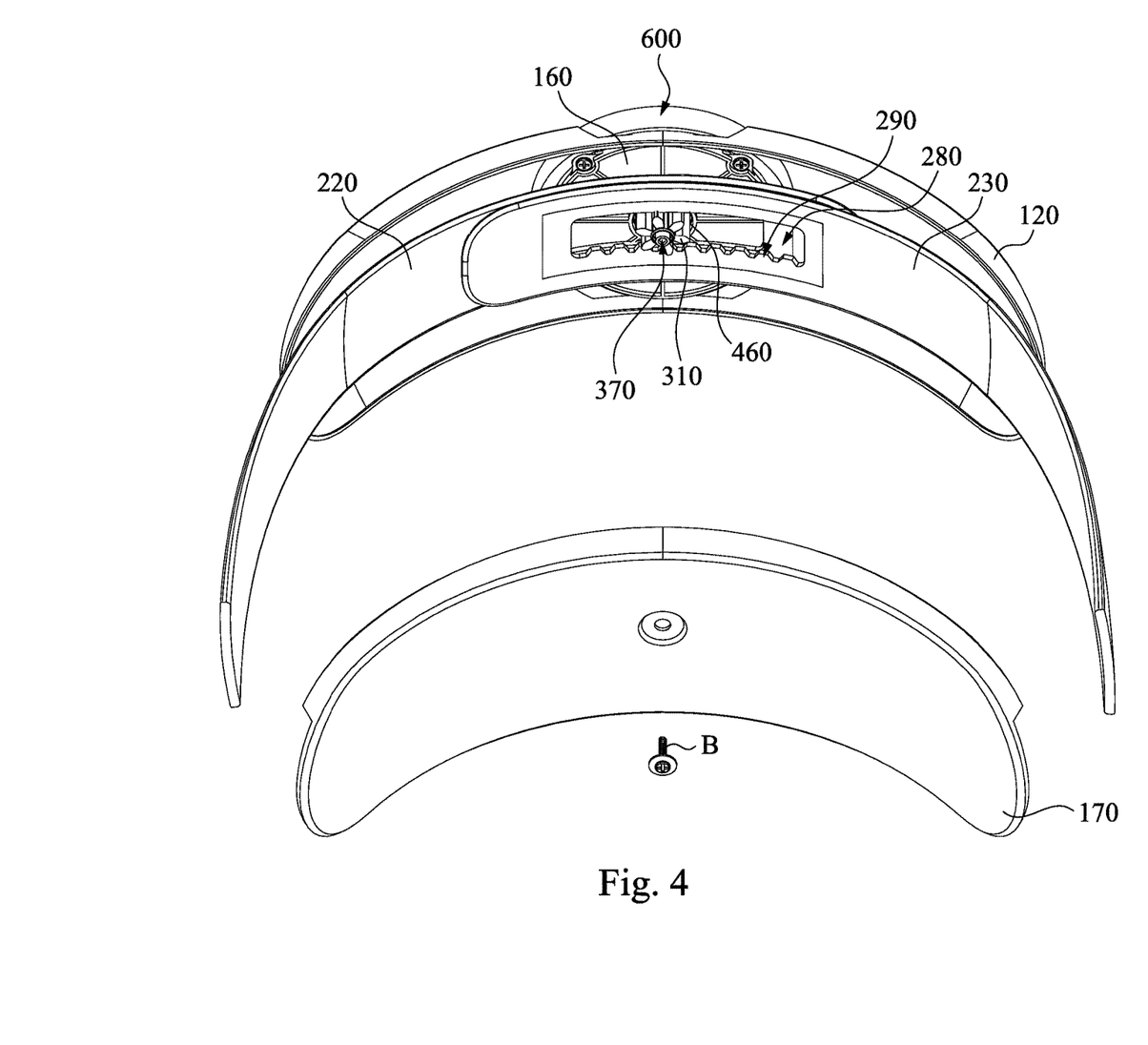
FIG. 4 is an operational schematic view of the strip body of the headband adjustment structure according to the aforementioned embodiment.
Figure 5A:
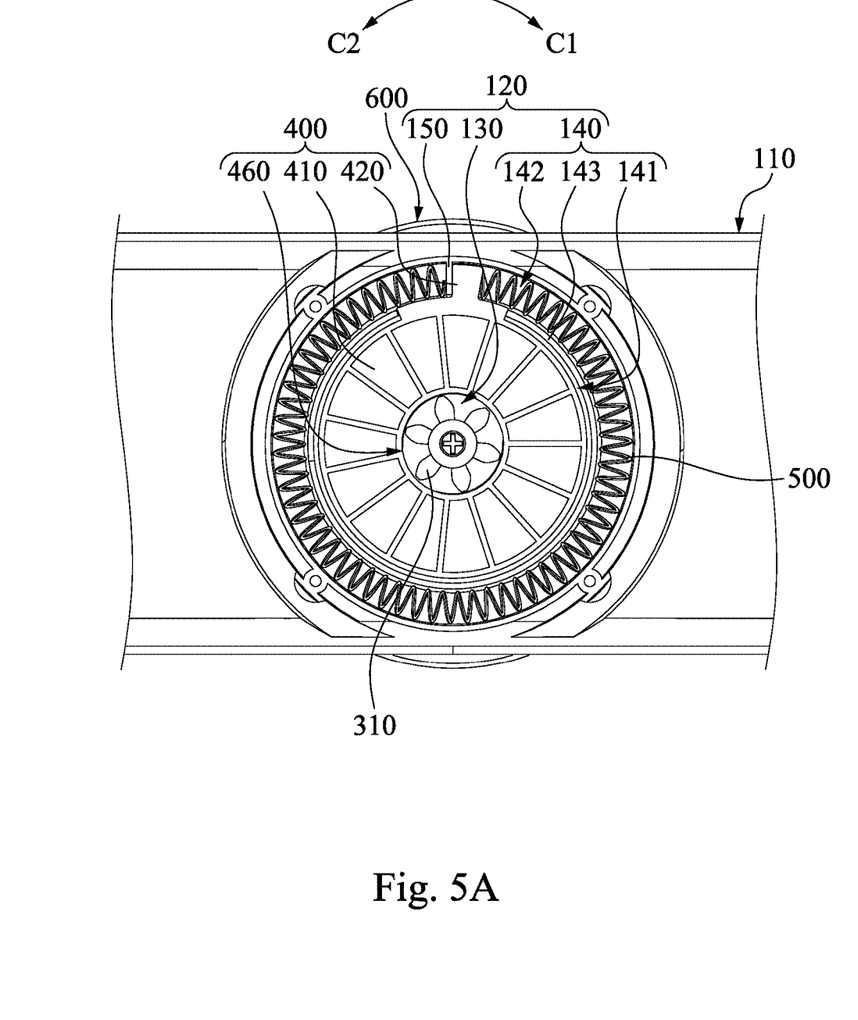
FIG. 5A is a schematic view of the linkage member of FIG. 1 before compressing the elastic element.

FIG. 4 is an operational schematic view of the strip body 210 of the headband adjustment structure 100 according to the aforementioned embodiment. FIG. 5A is a schematic view of the linkage member 400 of FIG. 1 before compressing the elastic element 500. As shown in FIG. 2A and FIG. 4, the first end portion 220 of the strip body 210 includes a first elongated hole 260 and a first toothed rack 270. The first elongated hole 260 is formed on the first end portion 220 of the strip body 210 to penetrate through the first end portion 220 of the strip body 210, and the first toothed rack 270 is located at one long side edge of the first elongated hole 260. The second end portion 230 of the strip body 210 includes a second elongated hole 280 and a second toothed rack 290. The second elongated hole 280 is formed on the second end portion 230 of the strip body 210 to penetrate through the second end portion 230 of the strip body 210, and the second toothed rack 290 is located at one long side edge of the second elongated hole 280. Since the first end portion 220 and the second end portion 230 are overlapped with each other, the first elongated hole 260 and the second elongated hole 280 are aligned to and overlapped with each other, and the first toothed rack 270 and the second toothed rack 290 are opposite to each other.

The rotary adjusting assembly 300 is pivotally located within the base 110. A front end of the rotary adjusting assembly 300 is provided with a gear body 310. The gear body 310 goes through the first elongated hole 260 and the second elongated hole 280 which are overlapped with each other, and the gear body 310 is arranged between the first toothed rack 270 and the second toothed rack 290, and engaged with the first toothed rack 270 and the second toothed rack 290. The linkage member 400 is disposed on the base 110, and connected to the rotary adjusting assembly 300. The elastic element 500 abuts against the linkage member 400 and the base 110, respectively (FIG. 5A). Thus, the rotating gear body 310 is able to simultaneously move the first end portion 220 and the second end portion 230 in opposite directions for enlarging or shortening the size of the adjustable accommodation space 250.

Figure 5B:
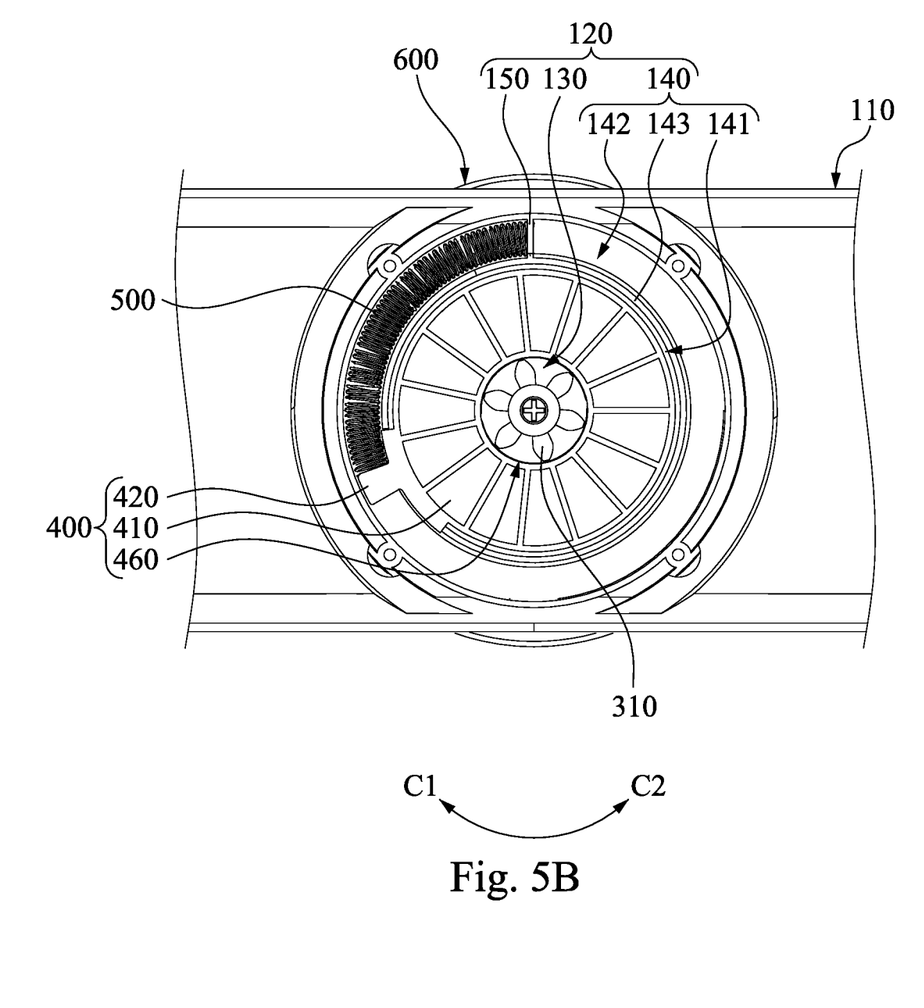
FIG. 5B is a schematic view of the linkage member of FIG. 1 after compressing the elastic element.

FIG. 5B is a schematic view of the linkage member 400 of FIG. 1 after compressing the elastic element 500. As shown in FIG. 4 and FIG. 5B, when the user exerts to pull the first end portion 220 and the second end portion 230 of the strip body 210 so that the first toothed rack 270 and the second toothed rack 290 are simultaneously moved to rotate the gear body 310, the rotary adjusting assembly 300 can be simultaneously rotated to move the linkage member 400 in a first rotation direction C1. In this moment, the linkage member 400 compresses the elastic element 500 so that the elastic element 500 stores a restored elastic force in a compression state. On the contrary, when the user stops exerting to resume the elastic element 500 back to the natural state, the restored elastic force of the elastic element 500 pushes the linkage member 400 in a second rotation direction C2 being opposite to the first rotation direction C1, so that the rotary adjusting assembly 300 reversely restores the first end portion 220 and the second end portion 230 of the strip body 210.

In specific, as shown FIG. 2A and FIG. 5A, the base 110 includes a bottom case 120, a cover body 160 and a front cover 170. The bottom case 120 includes a penetrating hole 130, a recess 140 and a pressing plate 150. The recess 140 is formed with a receiving area 141 and an annular groove area 142. The receiving area 141 and the annular groove area 142 are formed on the same surface of the bottom case 120 facing towards the wearing unit 200. The penetrating hole 130 penetrates through the bottom case 120 to be in communication with the receiving area 141. The size of the receiving area 141 is the same as the size of the linkage member 400, so that the receiving area 141 can receive the linkage member 400 exactly. The receiving area 141 and the annular groove area 142 are separable though an annular partition 143 so that the annular groove area 142 surrounds the receiving area 141 to receive the elastic element 500. The pressing plate 150 is located within the annular groove area 142. For example, the elastic element 500 is an expansion spring which is elongated, and curvedly accommodated in the annular groove area 142. One end of the expansion spring is directly abutted with one part of the linkage member 400, and another end of the expansion spring is directly abutted with the pressing plate 150. However, the disclosure is not limited thereto, the elastic element 500 may also be a similar element such as a reed. The cover body 160 fixedly covers the receiving area 141 and the annular groove area 142 of the recess 140 so that the linkage member 400 and the elastic element 500 can only be steadily moved in the corresponding area. Furthermore, the cover body 160 is formed with a penetration opening 161 which is in communication with the receiving area 141, and the gear body 310 extends out of the cover body 160 through the penetration opening 161 (FIG. 3). The front cover 170 fixedly covers the wearing unit 200 and the same surface of the bottom case 120 facing towards the wearing unit 200, so that the wearing unit 200 can only be moved stably within the base 110.

As shown in FIG. 2B and FIG. 3, a rear end of the rotary adjusting assembly 300 is further provided with a rotating frame 320 and a screw hole 370. The rotating frame 320 is coaxially fixed to the gear body 31, and abuts against the linkage member 400. In other words, the gear body 310 and the rotating frame 320 commonly share a rotation axis R. The screw hole 370 is located at the rotating frame 320 and the gear body 310 and is coaxial with the rotation axis R.

Specifically, as shown in FIG. 2A and FIG. 3, the linkage member 400 includes a rotary plate 410, an abutting rib 420, a concave portion 430 and a through hole 460. The rotary plate 410 has a first surface 411, a second surface 412 and a circumferential surface 413. The second surface 412 is opposite to the first surface 411, and the circumferential surface 413 is coupled to the first surface 411 and the second surface 412. The abutting rib 420 is formed on the circumferential surface 413 of the rotary plate 410, and projected outwardly for abutting against one end of the elastic element 500. More specifically, the abutting rib 420 extends into the annular groove area 142 and abuts against one end of the elastic element 500. The concave portion 430 is formed on the first surface 411 of the rotary plate 410, and provided with a pushing portion (e.g., ratchet teeth 450, FIG. 6). The rotating frame 320 is rotatably disposed within the concave portion 430 to abut against the pushing portion (e.g., ratchet teeth 450, FIG. 6) for pushing the rotary plate 410. The through hole 460 penetrates through the rotary plate 410 to adjoin the first surface 411 and the second surface 412. The gear body 310 goes through the through hole 460, and extends outwards the second surface 412 of the rotary plate 410 from the concave portion 430.

Thus, when the gear body 310 rotates in a first rotation direction C1 for increasing the size of the adjustable accommodation space 250, since the rotating frame 320 located within the concave portion 430 can push the pushing portion (e.g., ratchet teeth 450, FIG. 6) in the first rotation direction C1, the linkage member 400 can compress the elastic element 500 with the abutting rib 420. On the contrary, when the gear body 310 rotates in a second rotation direction C2 being opposite to the first rotation direction C1 for decreasing the size of the adjustable accommodation space 250, the rotating frame 320 fails to push the rotary plate 410 in the second rotation direction C2, and the rotating frame 320 is free to rotate without blocking in the concave portion 430 towards the second rotation direction C2 instead.

Figure 6:
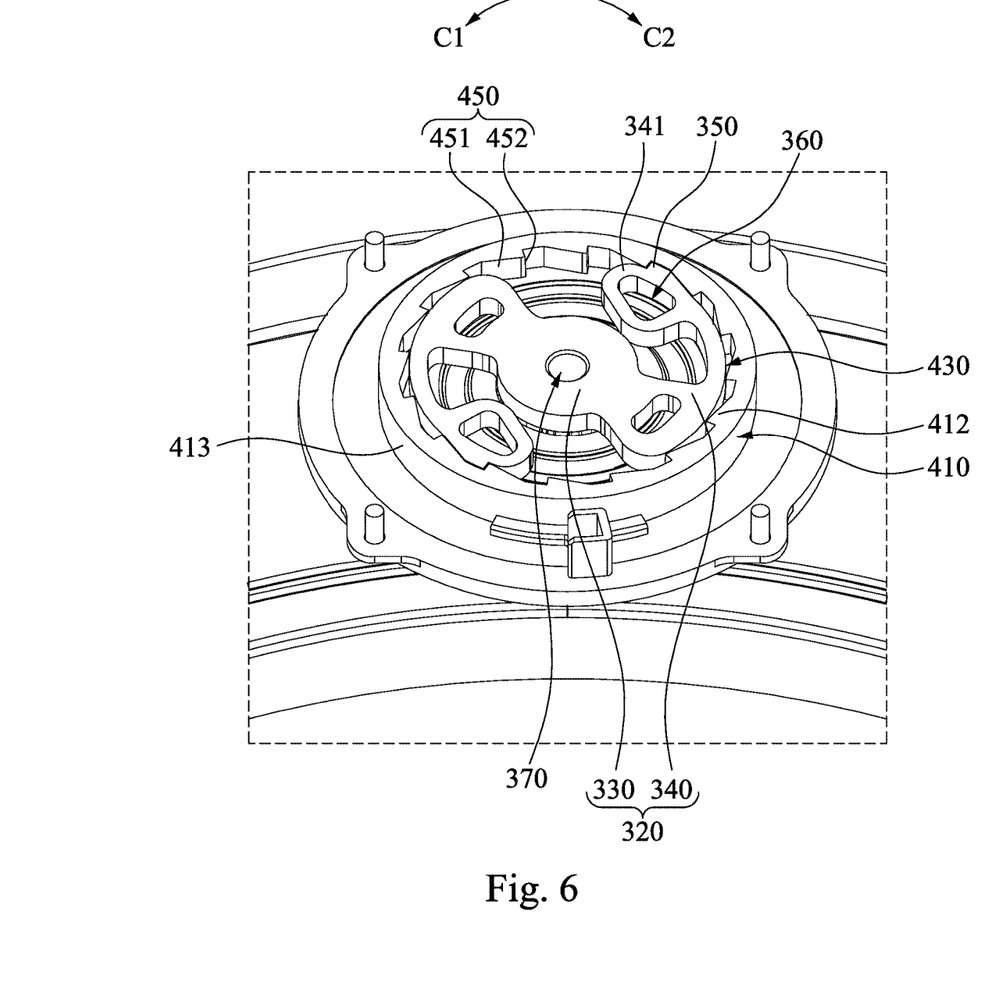
FIG. 6 is a connection relationship view of the rotating frame and the pushing portion according to the aforementioned embodiment.

Specifically, the pushing portion includes a plurality of ratchet teeth 450. The ratchet teeth 450 are arranged equally spaced on an inner wall of the concave portion 430 to surround the rotating frame 320. Each of the ratchet teeth 450 is provided with a guiding side surface 451 and a stop surface 452. Each of the guiding side surfaces 451 is connected to two adjacent ones of the stop surfaces 452, respectively.

FIG. 6 is a connection relationship view of the rotating frame 320 and the pushing portion according to the aforementioned embodiment. As shown in FIG. 2A and FIG. 6, the rotating frame 320 includes a bottom frame 330 and two elastic arms 340. The gear body 310 is fixedly connected to one surface of the bottom frame 330. The elastic arms 340 are oppositely disposed on the outer edge of the bottom frame 330 opposite to the gear body 310. Each of the elastic arms 340 is arched in which one end of the elastic arm 340 is connected to one side of the bottom frame 330, and the other end of the elastic arm 340 which is extended outwardly is provided with a free end 341, and is convexly formed with a stopper 350. The stopper 350 of each of the elastic arms 340 directly abuts against the guiding side surface 451 of one of the ratchet teeth 450 and a stop surface 452 of the neighboring one of the ratchet teeth 450 that is acted as a force point for effectively pushing the linkage member 400.

Thus, when the rotating frame 320 of the rotary adjusting assembly 300 is rotated towards the second rotation direction C2, the free end 341 of each of the elastic arms 340 is pressed towards the bottom frame 330 so that the stopper 350 of each of the elastic arms 340 can be moved to the next one of the ratchet teeth 450 along the guiding side surface 451 of one of the ratchet teeth 450 in order to feel the continuous sound and abrupt feel during the rotation. Thus, since the rotating frame 320 is not blocked by the stop surface 452 of each of the ratchet teeth 450 during the rotation in the second rotating direction C2, the rotating frame 320 can only freely rotate in the concave portion 430.

As shown in FIG. 2B and FIG. 3, the headband adjustment structure 100 further includes a rotary knob 600 abutting against the rotary adjusting assembly 300 for rotating the gear body 310, thereby adjusting the size of the adjustable accommodation space 250. For example, the rotary knob 600 is rotatably located on a side of the bottom case 120 facing away from the linkage member 400.

More specifically, the rotary knob 600 is provided with a main body 610, two columns 620 and a screw post 630. The columns 620 and the screw post 630 are disposed on one surface of the main body 610, and are parallel with each other. The screw post 630 goes through the penetrating hole 130 of the bottom case 120 and the screw hole 370 of the rotary adjusting assembly 300, and a bolt is screwed by the screw post 630 so that the rotary knob 600, the bottom case 120, the rotary adjusting assembly 300, the cover body 160 and the front cover 170 are united together, and a long axis direction L of the bolt B is coaxial with a rotation axis R of the rotary adjusting assembly 300.

The rotating frame 320 is formed with two sunken portions 360 (FIG. 6). Each of the sunken portions 360 is located at the free end 341 of one of the elastic arms 340 so that each of the columns 620 can insert one of the sunken portions 360 for assisting the rotary knob 600 to drive the rotating frame 320 rotating. Therefore, when the rotary knob 600 rotates the rotating frame 320, the gear body 310 of the rotary adjusting assembly 300 is allowed to reversely move the first end portion 220 and the second end portion 230 through the columns 620 pushing the sunken portions 360 for adjusting the size of the adjustable accommodation space 250. However, each of the sunken portion 360 is not limited to a though hole or a blind hole.

Figure 7:
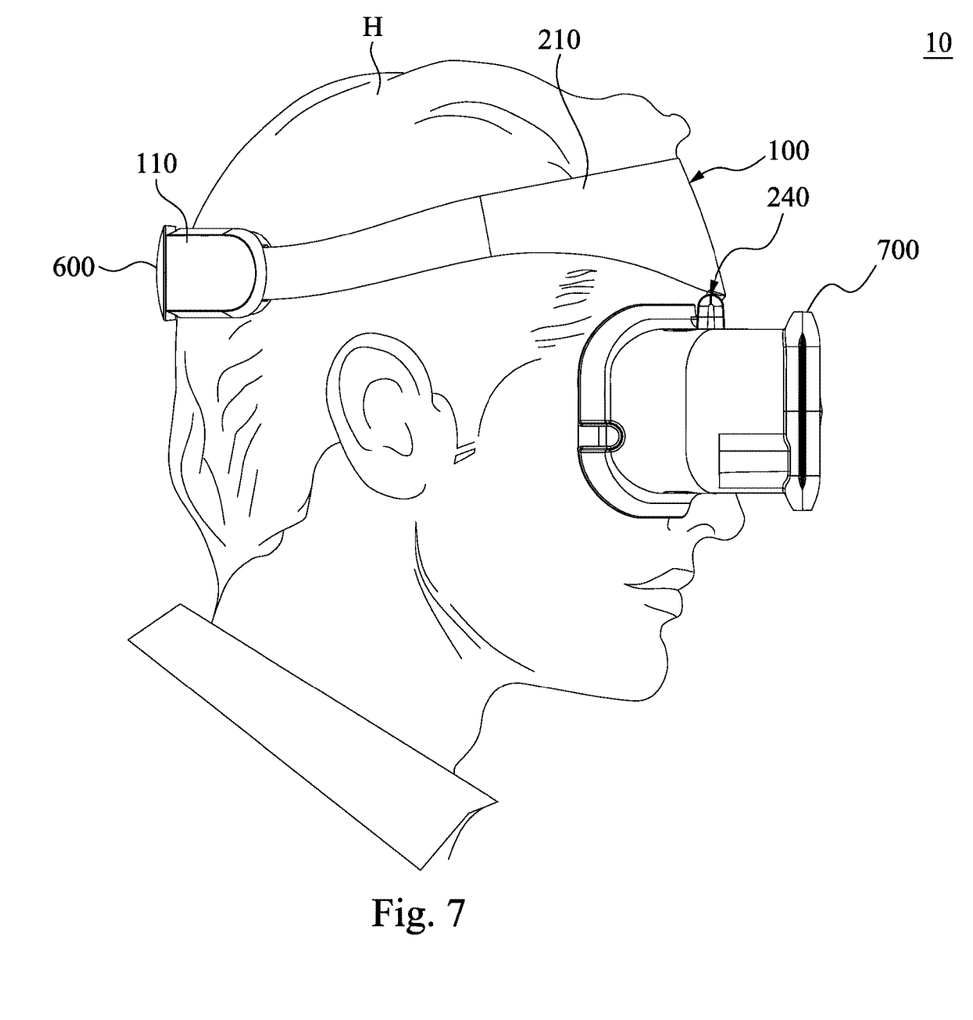
FIG. 7 is a side view of a headset electronic device which is being worn according to one embodiment of the disclosure.

FIG. 7 is a side view of a headset electronic device 10 which is being worn according to one embodiment of the disclosure. In the embodiment, the headset electronic device 10 includes a display 700 and the aforementioned headband adjustment structure 100. The strip body 210 further includes a connection portion 240 that is disposed between the first end portion 220 and the second end portion 230, and connected to the display 700. Thus, when the user's head H wears the headset electronic device 10 thereon, the user's head H extends into a larger adjustable accommodation space 250 first, next, the user rotates the rotary knob 600 in the second rotating direction C2 so as to shorten the aforementioned larger adjustable accommodation space 250 with the gear body 310. Next, when the user would like to wear the headset electronic device 10 with the same adjustable accommodation space 250 again, the user can stretch the strip body 210 to compress the elastic element 500, so that the elastic force of the elastic element 500 can resume the strip body 210 to the specific adjustable accommodation space 250.

Therefore, with the structure described in the above embodiments, the headband adjustment structure not only can appropriately adjust the adjustable accommodation space defined by the headband for the user's head, but also can closely match the specific size of the user's head, thereby increasing the user's willingness to use.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A headband adjustment structure, comprising:
   a base comprising a bottom case and a cover body, the bottom case comprising a recess formed with a receiving area and an annular groove area surrounding the receiving area, and a pressing plate located within the annular groove area, and the cover body fixedly covering the recess, and formed with a penetration opening;
   a wearing unit comprising a first end portion and a second end portion which are opposite to and overlapped with each other, the first end portion and the second end portion which are movably located in the base to define an adjustable accommodation space, wherein the first end portion is formed with a first toothed rack, and the second end portion is formed with a second toothed rack;
   a rotary adjusting assembly pivotally located within the receiving area of the base, and provided with a gear body, the gear body extending out of the cover body through the penetration opening, arranged between the first toothed rack and the second toothed rack and engaged with the first toothed rack and the second toothed rack so as to simultaneously move the first end portion and the second end portion in opposite directions for adjusting a size of the adjustable accommodation space, wherein an axis of the gear body is coaxial with an axis of the annular groove area;
   a linkage member disposed within the receiving area of the base, and connected to the rotary adjusting assembly; and
   an elastic element which is elongated and curvedly accommodated in the annular groove area to become a C-type elastic element, and the elastic element abutting against the linkage member and the base, respectively, wherein a part of the linkage member extends into the annular groove area to abut against one end of the elastic element, and the pressing plate is located within the annular groove area to abut against another end of the elastic element,
   wherein, when the first toothed rack and the second toothed rack are simultaneously moved to rotate the gear body, the rotary adjusting assembly is allowed to drive the linkage member to compress the elastic element, so that the elastic element that is compressed stores a restored elastic force.

2. The headband adjustment structure of claim 1, wherein the rotary adjusting assembly is further provided with a rotating frame, the rotating frame is coaxially fixed to the gear body and abuts against the linkage member.

3. The headband adjustment structure of claim 2, wherein the linkage member comprises:
   a rotary plate having a first surface, a second surface that is opposite to the first surface, and a circumferential surface that is coupled to the first surface and the second surface;
   an abutting rib formed on the circumferential surface of the rotary plate for abutting against the one end of the elastic element;
   a concave portion formed on the first surface of the rotary plate, and provided with a pushing portion, wherein the rotating frame is rotatably disposed within the concave portion to abut against the pushing portion; and
   a through hole penetrating through the rotary plate, and connected to the concave portion and the second surface of the rotary plate, wherein the gear body goes through the through hole to extend outwards the second surface of the rotary plate from the concave portion,
   wherein when the gear body rotates in a first rotation direction to increase the size of the adjustable accommodation space, by pushing the pushing portion with the rotating frame, the linkage member compresses the elastic element using the abutting rib.

4. The headband adjustment structure of claim 3, wherein the rotating frame is free to rotate in the concave portion towards a second rotation direction being opposite to the first rotation direction.

5. The headband adjustment structure of claim 4, wherein the pushing portion comprises a plurality of ratchet teeth, the ratchet teeth are arranged equally spaced on an inner wall of the concave portion to surround the rotating frame, each of the ratchet teeth is provided with a guiding side surface and a stop surface, and each of the guiding side surfaces is connected to two adjacent ones of the stop surfaces, respectively; and
   the rotating frame comprises a bottom frame and at least one elastic arm, the bottom frame is fixedly connected to the gear body, and the at least one elastic arm is arched in which one end of the at least one elastic arm is connected to one side of the bottom frame, and the other end of the at least one elastic arm is convexly formed with a stopper, and the stopper directly abuts against the stop surface of one of the ratchet teeth for pushing the abutting rib of the linkage member to compress the elastic element,
   wherein when the rotating frame is rotated towards the second rotation direction, the stopper of the at least one elastic arm moves to another of the ratchet teeth along the guiding side surface of one of the ratchet teeth.

6. The headband adjustment structure of claim 2, further comprising:
   a rotary knob abutting against the rotary adjusting assembly for rotating the gear body.

7. The headband adjustment structure of claim 6, wherein the rotating frame is formed with a sunken portion, and the rotary knob is provided with a column inserting into the sunken portion,
   wherein when the rotary knob rotates the rotating frame, the gear body of the rotary adjusting assembly is allowed to reversely move the first end portion and the second end portion through the column pushing the sunken portion for adjusting the size of the adjustable accommodation space.

8. The headband adjustment structure of claim 6, wherein the rotary knob is fixedly screwed on the rotary adjusting assembly with a bolt, and a long axis direction of the bolt is coaxial with a rotation axis of the rotary adjusting assembly.

9. A headset electronic device, comprising:
a display; and
a headband adjustment structure, comprising:
  a base comprising a bottom case and a cover body, the bottom case comprising a recess formed with a receiving area and an annular groove area surrounding the receiving area, and a pressing plate located within the annular groove area, and the cover body fixedly covering the recess, and formed with a penetration opening;
  a wearing unit comprising a strip body, a first toothed rack and a second toothed rack, the strip body comprises a connection portion connected to the display, a first end portion and a second end portion which are opposite to and overlapped with each other, the first end portion and the second end portion which are movably located in the base to define an adjustable accommodation space, wherein the first toothed rack is located on the first end portion, and the second toothed rack is located on the second end portion;
  a rotary adjusting assembly pivotally located within the receiving area of the base, and provided with a gear body, the gear body extending out of the cover body through the penetration opening, arranged between the first toothed rack and the second toothed rack and meshed with the first toothed rack and the second toothed rack so as to simultaneously move the first end portion and the second end portion in opposite directions for adjusting a size of the adjustable accommodation space, wherein an axis of the gear body is coaxial with an axis of the annular groove area;
  a linkage member disposed within the receiving area of the base, and connected to the rotary adjusting assembly; and
  an elastic element which is elongated and curvedly accommodated in the annular groove area to become a C-type elastic element, and the elastic element abutting against the linkage member and the base, respectively, wherein a part of the linkage member extends into the annular groove area to abut against one end of the elastic element, and the pressing plate is located within the annular groove area to abut against another end of the elastic element,
  wherein, when the first toothed rack and the second toothed rack are simultaneously moved to rotate the gear body, the rotary adjusting assembly is allowed to drive the linkage member to compress the elastic element, so that the elastic element that is compressed stores a restored elastic force.

* * * * *